Aug. 13, 1968   W. J. OTTO   3,397,135
INTEGRAL PUMP AND FILTER ASSEMBLY INCLUDING ELECTRODE MEANS
Filed Sept. 21, 1964   3 Sheets-Sheet 1
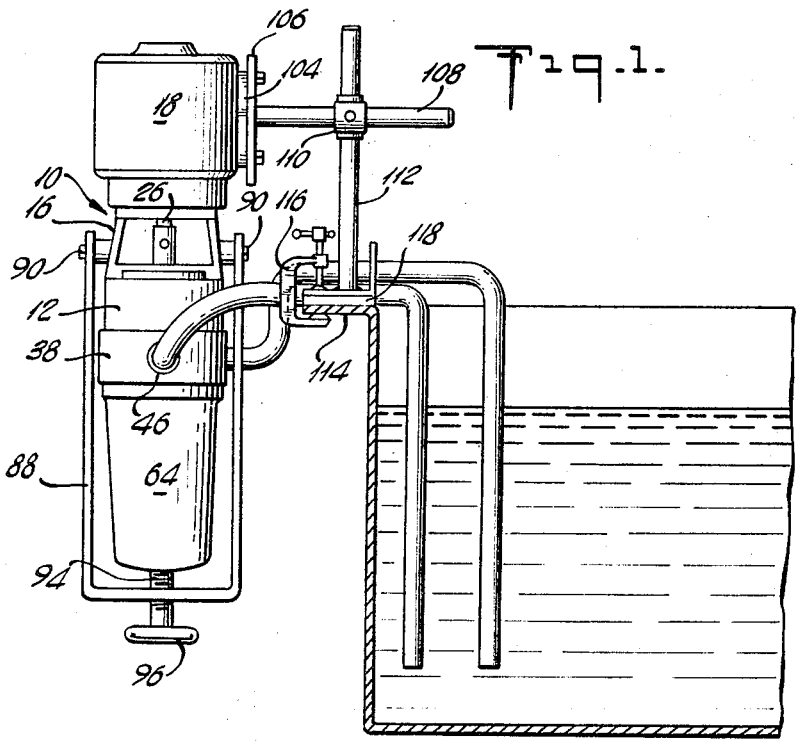
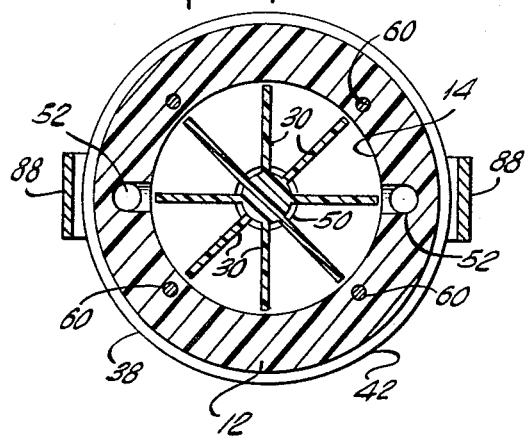
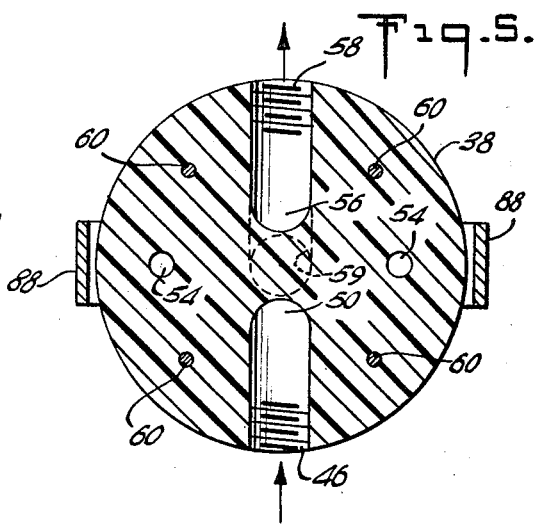
INVENTOR.
WALTER J. OTTO
BY
Nolte & Nolte
ATTORNEYS

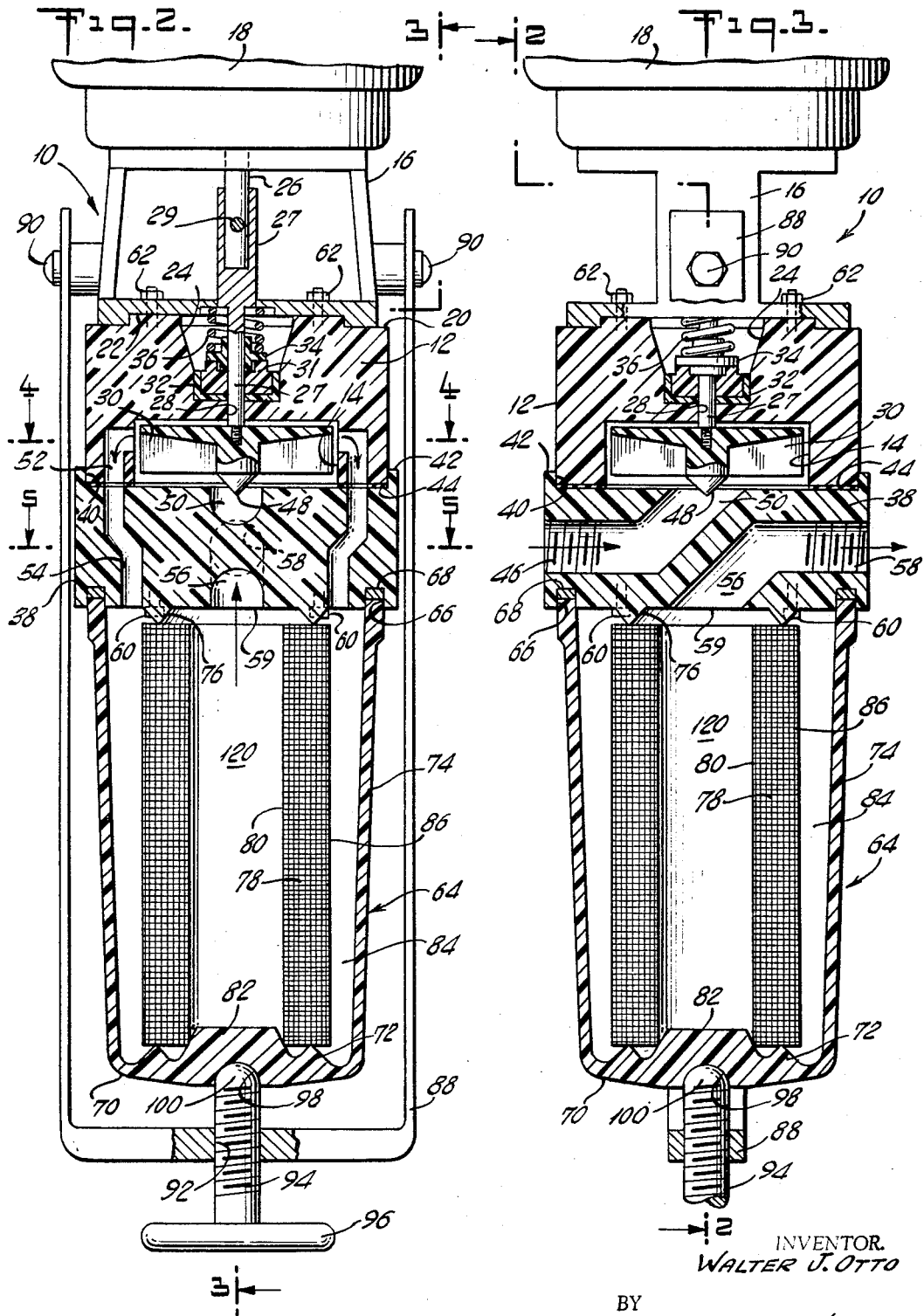

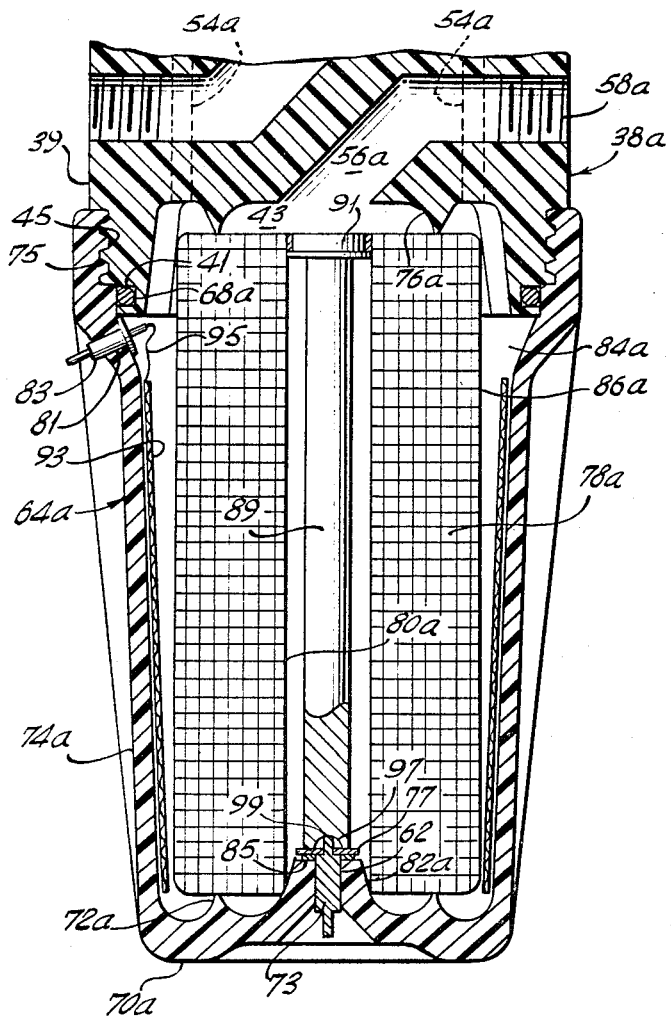

United States Patent Office 3,397,135
Patented Aug. 13, 1968

3,397,135
INTEGRAL PUMP AND FILTER ASSEMBLY
INCLUDING ELECTRODE MEANS
Walter J. Otto, Wantagh, N.Y., assignor to Julius L.
Englesberg, Rockville Centre, N.Y.
Filed Sept. 21, 1964, Ser. No. 397,805
8 Claims. (Cl. 204—276)

ABSTRACT OF THE DISCLOSURE

An integral pump and filter assembly in which a pump is responsive to drive means and comprises a body portion disposed below the drive means, an impeller, electrode means and filter means disposed below the body portion.

The present invention relates to filter systems and in particular to an integral pump and filter assembly made for filtering solids and electrolytically removing metallic impurities from corrosive solutions, which may be attached and operated in any position to wall surfaces of tanks, shelfs, etc.

In many industrial operations where it is necessary to filter impurities from the liquid being utilized, it is not practical to employ large or permanent filtering units. Space may not be available to install a large filtering system or a large filtering unit may be too expensive. In addition, it is often necessary to employ a filter and pump assembly under circumstances which require a high degree of maneuverability and adaptability. Thus, the pump and filter assembly should be designed to mount in any position and in awkward areas where accessibility is limited.

In photographic and electroplating solutions, solids and dissolved metallic impurities tend to build up as the solution is worked. In photographic solutions, solids such as gelatin from the film, dust from the atmosphere and dissolved metallic impurities like silver build up during usage of the solution. If these impurities are not removed in time, either the photographic film being processed becomes defective or the solution has to be discarded and a new one made up.

In electroplating solutions, such as nickel plating solutions, solids on the work being processed are carried into the solution and shop dust in the air settles on the surface. Dissolved impurities resulting from chemical attack on copper, zinc, iron and lead objects being plated also build up during usage. If these impurities are not removed, pitted, spotted, or dark deposits result.

For the removal of solids, the depth type filter tube is used in the filter chamber. For the removal of dissolved impurities, electrolytic purification at low current density is resorted to.

Although electrolytic purification is a practical art, it is now customarily done inside the photographic tank or inside the plating tank. When done inside the plating tank, work cannot be processed.

Accordingly, a pump and filter assembly should also be capable of filtering and purifying electrolytic solutions containing dissolved metal ions and impurities.

Furthermore, such a filter and pump assembly should be adapted for easy disassembly and for quick removal and replacement of the filter and other elements thereby facilitating convenient maintenance of the assembly.

It is an object of this invention, therefore to provide an improved integral pump and filter assembly which is low in cost and preferably made of plastic material.

It is another object of this invention to provide an integral pump and filter assembly applicable for electrolytic purification and filtration at the same time.

It is still another object of the invention to provide a highly adaptable and maneuverable pump and filter assembly which may be mounted in a variety of positions.

Still another object of the invention is to provide an integral pump and filter assembly which may be easily taken apart for cleaning and maintenance.

The integral pump and filter assembly of this invention includes a pump body secured to one side of an intermediate ported member. A cylindrical shell is secured to the opposite side of the ported member. A cylindrical filter is concentrically spaced within the shell with its ends in sealing engagement with respectively the ported member and the shell bottom. The pump body includes an impeller chamber which communicates with an inlet passage in the ported member and discharges through passages into the shell exterior of the cylindrical filter. The pumped fluid after passage through the filter flows into an outlet passage also formed in the intermediate ported member. Rotatable impeller and associated pump elements operate within the pump body and create a liquid flow from the pump inlet, through the filter element, and outwardly through the discharge passage in the intermediate ported member. For electrolytic purification of the fluid, a carbon anode is inserted inside the entire length of the filter, and concentric with it, and a stainless steel wire gauze cathode is positioned along the side of the shell and concentric with it. Leads from these electrodes are brought out through the shell and an electric current is impressed. Metal deposits out of the solution and collects on the stainless steel gauze. Excellent recovery can be obtained because fresh solution is always being brought to the negative electrodes during the course of the filtration. Although the electrolytic recovery of metal is a practical art, it has never been combined in a filter system such as the present invention discloses.

Other objects and a fuller understanding of the invention may be had by referring to the following description and claims, taken in conjunction with the accompanying drawings in which:

FIG. 1 is a front elevation view of one embodiment of the device as applied to a tank.

FIG. 2 is a sectional view of the filter unit shown in FIG. 1 taken along lines 2—2 of FIG. 3.

FIG. 3 is a transverse section taken along lines 3—3 of FIG. 2.

FIG. 4 is a plan section taken along lines 4—4 of FIG. 2.

FIG. 5 is a plan section taken along lines 5—5 of FIG. 2.

FIG. 6 is another embodiment of the invention, also showing the electrode arrangement.

Referring now to the embodiment illustrated in FIGS. 1 to 5, wherein similar reference numerals identify corresponding parts throughout the several views, 10 represents an integral pump and filter assembly, substantially as shown.

A plastic pump body 12 generally cylindrical in shape includes a pump chamber 14 centrally positioned about the longitudinal axis of the pump body, in the lower portion thereof. A motor bracket 16, supporting a motor 18 is adapted to be mounted upon the top surface 20 of pump body 12. Lip 22 acts as a centering element for motor bracket 16. A motor shaft 26 extends downwardly from motor 18. The shaft 26, is coupled by means of a set screw 29 to an extension piece 27, which extends downwardly through chamber 24 and aperture 28 into pump chamber 14. The two-piece construction of the motor shaft and extension piece 26 and 27 respectively, is provided for alignment purposes and facilitates easy disassembly of the motor 18 from the pump body 12.

An impeller 30 is screwed onto the end of extension piece 27 within chamber 14. A stationary seal 32 is fitted in the bottom portion of chamber 24. A stuffing box 31 is positioned on top of stationary seal 32, and encompasses rotary seal 34 upon which the bottom of spring 36 rests. Thus, spring 36 is compressed between rotary seal 34 and the bottom of motor bracket 16 thereby insuring a liquid tight seal between chamber 24 and pump chamber 14.

A plastic filter cover 38, having a recess 40 defined by annular lip 42 of the plastic filter cover 38, is fitted snugly up against the bottom surface of pump body 12, so that lip 42 encompasses the outer periphery of plastic pump body 12. A gasket 44 provides a suitable seal between the pump body 12 and the plastic filter cover 38. Filter cover 38 includes an assembly inlet port 46 which communicates with eye 48 of impeller 30 through inlet passage 50. The outer periphery of pump chamber 14 includes pump chamber outlet passages 52, which communicate with filter cover passages 54 aligned therewith directly below the pump outlet passages. Filter cover 38 also includes an aperture 59 extending through an outlet passage 56 and communicating with assembly outlet port 58. Bolts 60 and nuts 62 provide a means for fastening together motor bracket 16, plastic pump body 12, and plastic filter cover 38.

An annular opening 66 is provided in the underside of plastic filter cover 38. An impervious cupped plastic shell 64 is fitted up against the underside of filter cover 38 within annular opening 66. Shell gasket 68 provides the requisite seal between shell 64 and plastic filter cover 38. The shell 64 includes a bottom portion 70 and an upstanding cylindrical wall member 74. The bottom portion 70 of shell 64 includes a circular ridge 72 extending upwardly from bottom 70, concentric with and spaced from wall member 74. Another circular ridge 76 extends downwardly from the bottom of filter cover 38, in line with and spaced apart from circular ridge 72. A suitable cylindrical filter 78 rests on ridge 72, the interior surface 80 of the filter abutting circular ledge 82, said circular ledge 82 being formed by ridge portion 72. The top of cylindrical filter 78 is pressed up against ridge 76 thereby defining a shell chamber 84 formed between the exterior surface 86 of the filter and the interior of shell wall 74.

A U-shaped bail 88 depends downwardly from pivot screw 90, upon which the U-shaped bail is mounted. Pivot screw 90 is in turn secured to motor bracket 16. The U-shaped bail extends downwardly beneath shell 64, the bottom of bail 88 having a threaded aperture 92 extending therethrough. A threaded clamping screw 94 having a knob handle 96 is adapted to engage through grooved aperture 92. The bottom portion 70 of shell 64 includes on the outer surface thereof a smooth concave indentation 98 into which the convex end 100 of screw 94 may cooperatively and slidingly engage. Thus, after the filter has been placed within shell 64 on ridges 72, the shell is fitted snugly up against shell gasket 68 within annular opening 66, and bail 88 is then rotated about pivot screw 90 to a position wherein the convex head 100 of screw 94 is directly beneath indentation 98. Knob handle 96 is then rotated to a position such that screw 94 moves through aperture 92 until convex head 100 comes into contact with indentation 98. Knob handle 96 is then rotated to bring sufficient pressure to bear upon the bottom of shell 64 and thereby provides the requisite tight cooperation between the shell 64 and filter cover 38.

Motor frame 104 is provided with a suitable supporting bracket 106 having a horizontal extension arm 108 supported in a two-way adjustment bracket 110. The entire assembly, therefore, may be adjustably moved both vertically and horizontally; vertically along vertical posts 112, and horizontally along horizontal extension arm 108. Two-way adjustment bracket 110 may be located where desired, as for example on top of the rim flange of a tank 114, and there clamped in position by a C clamp 116. Suitable spacing insulator 118 of any suitable material may be employed for shock absorbing purposes. A material such as neoprene would be suitable.

Referring now to the operation of the pump and filter assembly, a hose, pipe or other suitable conduit (not shown) provides suitable fluid connection between the liquid to be filtered and assembly inlet port 46. The actuation of motor 18 drives impeller 30 through the medium of motor shaft extension piece 27. The pumping action of the impeller sucks liquid up through the hose into assembly inlet port 46, through inlet passage 50, and into the eye of the impeller. In the conventional manner, the centrifugal action of the impeller 30 forces the liquid under pressure through pump outlet 52, and thence through filter cover passages 54 into shell chamber 84. As liquid is forced into shell chamber 84 and through filter 78, all foreign matter in solid form is trapped in or on the filter. The liquid which has been filtered passes through filter 78, into filter chamber 120, and from there up through aperture 59 and along passage 56 outwardly to assembly outlet port 58. A suitable conduit (not shown) may be connected to assembly outlet port 58 to direct the filtered liquid into another tank, or back into the same tank or liquid holder from which the unfiltered liquid had been sucked by the action of the impeller. Thus, an efficient, compact, light-weight integral pump and filter assembly has been provided by the present invention. The assembly may be easily disassembled simply by unscrewing clamping screw 94, rotating bail 88 and removing shell 64 along with filter 78 positioned therein. The filter may then be replaced or cleaned, and the shell and filter returned to its operating position as explained hereinabove. If it is desired to dismantle the rest of the unit for maintenance or repair purposes, it is merely necessary, after removing shell 64, to remove bolts and nuts 60 and 62 and loosen set screw 102 to allow the filter cover 38 to be separated from the pump body 12.

Another embodiment of the invention is partially illustrated in FIG. 6. The pump and motor portion of the invention are not shown as they are the same as described in the previous embodiment illustrated by FIGS. 1 to 5. This embodiment differs from the one previously described in that the plastic shell piece 64a is fastened directly to the filter cover 38a, thereby eliminating the need for a bail, clamping screw, handle and associated hardware. This embodiment also shows the positioning of electrodes in the filter assembly for the effective filtration of electrolytic solutions containing metal ions.

Referring now to FIG. 6 in detail, the lower portion of the plastic filter cover is shown generally as 38a. The motor bracket and pump body (both not shown) are fastened together with the plastic filter cover 38a by conventional means such as bolts (also not shown). As before, the filter cover 38a includes an assembly outlet port 58a communicating with an outlet passage 56a. Outlet passage 56a opens into a recessed aperture 43 in the bottom portion of filter cover 38a. Representative filter cover passages 54a are shown in phantom to indicate the means by which fluid is forced under pressure from the pump outlet (not shown) into shell chamber 84a. A circular ridge 76a extends downwardly from the bottom portion of filter cover 38a and within recessed aperture 43, said ridge 76a surrounding the open end of outlet passage 56a. The lower exterior wall surface 39 of filter cover 38a is threaded at 45 in a screw type arrangement. Between the thread 45 termination and the bottom of the filter cover 38a, an annular slot 41 is provided in wall surface 39. A cupped impervious plastic shell piece 64a having a threaded inside upper wall portion 75 is fitted up against the lower portion of filter cover 38a so as to suitably engage threads 45. Shell gasket 68a is positioned in annular slot 41 so that a water tight seal is formed at the junction of shell piece 64a and filter cover 38a. Bottom 70a of shell 64a includes a circular ridge 72a extending upwardly from bottom 70a, concentric with and spaced from wall 74a of shell 64a, and a raised central portion 82a extending upward slightly above ridge 72a and having a flat top surface 85. A cylindrical passage 62 plugged by a feedthrough 73 communicates between top surface 85 and bottom 70a of shell piece 64a. An electrically conductive washer 77 is mounted on interior extending terminal 99 of feedthrough 83. A suitable cylindrical filter 78a rests on ridge 72a, the interior surface 80a of the filter 78a abutting the sides of central portion 82a. The top of cylindrical filter 78a is pressed up against ridge 76a to thereby define shell chamber 84a formed between the exterior surface 86a of filter 78a and the interior wall surfaces of the plastic shell 64a and the bottom of filter cover 38a. A carbon rod 89 extends axially through the center of filter 78a. The bottom surface of carbon rod 89 is notched 97 to engage the interior extending terminal 99 of feedthrough 73. Washer 77 communicates with the unnotched bottom surface of rod 89 and feedthrough 73 to provide increased surface area contact between feedthrough 83 and carbon rod 89. The top portion of rod 89 abuts up against a porous rod stop 91 integrally formed in the top portion of filter 78a. A stainless steel wire gauze cylinder 93 is positioned along and concentric with the inside wall portion 74a of shell piece 64a, said gauze cylinder 93 being spaced between wall portion 74a and filter wall surface 86a and in closer proximity to the former. Cylindrical passage 81 plugged by feedthrough 83 extends through wall portion 74a of shell piece 64a. Electrically conductive lead 95 is connected to gauze cylinder 93 and brought out through shell 64a by means of feedthrough 83.

The normal filtering action of the embodiment shown in FIG. 6 is the same as that described previously for the embodiment of FIGS. 1 to 5. However, when a direct current is passed between carbon rod 89 and wire gauze cylinder 93 by means of their respective feedthrough connections, the carbon rod 8 acts as a positive electrode and the gauze cylinder 93 as a negative electrode thereby causing certain metal ions present in the solution being filtered to be deposited on the gauze cylinder 93 as a solid metal.

It should be understood that the carbon rod and gauze cylinder shown in the embodiment illustrated by FIG. 6 would be easily adapted to and used in the embodiment shown in FIGS. 1 to 5, and thus the invention should not be thereby limited to the specific embodiments disclosed herein.

Thus an efficient, compact and lightweight integral pump and filter assembly capable of performing the combined operations of filtration and electrolytic purification has been provided by the present invention.

I claim:

1. An integral pump and filter assembly, comprising, in combination, drive means; pump means responsive to said drive means and including a body portion, a portion of said body portion being disposed beneath said drive means, said body portion being formed with a cavity in a lower face portion thereof, said cavity including at least one radial extension thereof; an impeller disposed in said cavity and connected to said drive means; first electrode means disposed within a portion of said pump and filter assembly; second electrode means for cooperating with said first electrode means; and filter means, including a filter body a portion of which is disposed beneath and being in contact with said body portion, said filter body formed with an inlet port and an outlet port in side portions thereof, said filter body further formed with a first channel communicating with said inlet port and a centermost portion of said cavity, said filter body formed with a second channel communicating with said outlet port and a first part of a lower face portion of said filter body, said filter body forming at least one conduit communicating with said extension of said cavity and a point at said lower face portion of the filter body spaced from said first part, a housing forming a filter chamber a portion of which is disposed beneath and in contact with said filter body, and a filter member disposed within said filter chamber.

2. An integral pump and filter assembly according to claim 1, wherein said filter chamber is centrally disposed within said housing.

3. An integral pump and filter assembly according to claim 1, wherein said filter member is tubular, said housing having a tubular wall extending coaxially with and exterior of said filter member in spaced concentric relationship therewith, said wall having an upper interior surface formed with first threads, a floor portion of said housing including a circular ridge in spaced concentric relationship with said tubular wall, said filter member being mounted on said ridge, said filter body being formed with second threads for mating threaded engagement with said first threads.

4. An integral pump and filter assembly according to claim 1, wherein said inlet and outlet ports are disposed diametrically opposite one another.

5. An integral pump and filter assembly according to claim 1, further including means for clamping said housing into liquid-tight engagement with said filter body.

6. An integral pump and filter assembly according to claim 5 wherein said clamping means includes a U-shaped bail member and an integral adjustment screw and knob.

7. An integral pump and filter assembly according to claim 1, wherein said first electrode means comprises a cylindrical wire gauze member.

8. An integral pump and filter assembly according to claim 7, wherein said gauze member is stainless steel, said second electrode means comprising a carbon rod extending along substantially the length of said filter member.

References Cited

UNITED STATES PATENTS

| | | | |
|---|---|---|---|
| 2,448,157 | 8/1948 | Schneider | 210—167 |
| 2,667,270 | 1/1954 | Cady et al. | 204—276 XR |
| 2,997,438 | 8/1961 | James et al. | 204—271 |
| 3,003,942 | 10/1961 | Cedrone | 204—272 |
| 3,172,850 | 3/1965 | Englesberg et al. | 210—172 |

HOWARD S. WILLIAMS, *Primary Examiner.*

D. R. JORDAN, *Assistant Examiner.*